US012333621B2

(12) United States Patent
Sato et al.

(10) Patent No.: US 12,333,621 B2
(45) Date of Patent: Jun. 17, 2025

(54) EVIDENCE MANAGEMENT METHOD, EVIDENCE MANAGEMENT SYSTEM, AND NODE

(71) Applicant: Hitachi, Ltd., Tokyo (JP)

(72) Inventors: Tatsuya Sato, Tokyo (JP); Taku Shimosawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 429 days.

(21) Appl. No.: 17/944,078

(22) Filed: Sep. 13, 2022

(65) Prior Publication Data

US 2023/0229795 A1 Jul. 20, 2023

(30) Foreign Application Priority Data

Jan. 20, 2022 (JP) ................................ 2022-007174

(51) Int. Cl.
*G06Q 30/00* (2023.01)
*G06Q 50/26* (2012.01)

(52) U.S. Cl.
CPC .................................. *G06Q 50/26* (2013.01)

(58) Field of Classification Search
None
See application file for complete search history.

(56) References Cited

FOREIGN PATENT DOCUMENTS

| | | |
|---|---|---|
| JP | 2019-028525 A | 2/2019 |
| JP | 2021-064891 A | 4/2021 |

OTHER PUBLICATIONS

Nakamoto, "Bitcoin: A Peer-to-Peer Electronic Cash System", [online], Internet resource found on Mar. 31, 2017 at <URL: https://bitcoin.org/bitcoin.pdf>, 9 pages.

*Primary Examiner* — Mila Airapetian
(74) *Attorney, Agent, or Firm* — PROCOPIO, CORY, HARGREAVES & SAVITCH LLP

(57) ABSTRACT

In a distributed ledger system including nodes of a plurality of organizations, a smart contract of a distributed ledger node of each of the organizations refers to information made open to the public in a public area, the information being related to an evidence held in a private area of each of the plurality of organizations, and in response to a trigger event of the information's meeting a given condition, executes a process of making the evidence open to the public in the public area, the evidence being held in the private area of an organization to which the smart contract belongs.

11 Claims, 13 Drawing Sheets

FIG. 4

D1 (STATE INFORMATION)

D1101 D1102 D1103 D1104

D1110

| SC TYPE | SC ID | SC BODY | INTERNAL TABLE |
|---|---|---|---|
| EVIDENCE MANAGEMENT | 0001 | ⟨BINARY⟩ | (see internal tables below) |
| | ... | ... | ... |
| ... | ... | ... | ... |

PUBLIC AREA

⟨EVIDENCE⟩

| VOTING ID | ORGANIZATION ID | EVIDENCE HASH VALUE | Salt | EVIDENCE |
|---|---|---|---|---|
| VOTING 1 | ORGANIZATION 1 | xyzxyz | abcdef | FOR |
| VOTING 1 | ORGANIZATION 2 | xyznnz | nngxea | AGAINST |
| VOTING 1 | ORGANIZATION 3 | xyzzzz | apanad | ABSTENTION |

⋮

PRIVATE AREA

⟨EVIDENCE⟩

| VOTING ID | EVIDENCE | Salt | EVIDENCE HASH VALUE |
|---|---|---|---|
| VOTING 1 | FOR | abcdef | xyzxyz |
| VOTING 2 | FOR | abcdgh | xyzyyy |

⋮

PUBLIC AREA

⟨EVIDENCE TOTALING RESULTS⟩

| VOTING ID | TOTALING RESULTS | EVALUATION |
|---|---|---|
| VOTING 1 | {FOR: 10, AGAINST: 3, ABSTENTION: 2} | APPROVED |
| VOTING 2 | {FOR: 3, AGAINST: 7, ABSTENTION: 2, NO VOTING: 3} | REJECTED |

ORGANIZATION 1

| VOTING ID | EVIDENCE | Salt | EVIDENCE HASH VALUE |
|---|---|---|---|
| VOTING 1 | FOR | abcdef | xyzxyz |
| VOTING 2 | FOR | abcdgh | xyzyyy |

FIG. 5B

ORGANIZATION 2

| VOTING ID | EVIDENCE | Salt | EVIDENCE HASH VALUE |
|---|---|---|---|
| VOTING 1 | AGAINST | nngxea | xyznnz |
| | | | |

FIG. 5C

| VOTING ID | ORGANIZATION ID | EVIDENCE HASH VALUE | Salt | EVIDENCE |
|---|---|---|---|---|
| VOTING 1 | ORGANIZATION 1 | xyzxyz | abcdef | FOR |
| VOTING 1 | ORGANIZATION 2 | xyznnz | — | — |
| VOTING 1 | ORGANIZATION 3 | xyzzzz | — | — |

FIG. 5D

| VOTING ID | TOTALING RESULTS | EVALUATION |
|---|---|---|
| VOTING 1 | {FOR: 10, AGAINST: 3, ABSTENTION: 2} | APPROVED |
| VOTING 2 | {FOR: 3, AGAINST: 7, ABSTENTION: 2, NO VOTING: 3} | REJECTED |

FIG. 6A

OPERATION WORK DEFINITION

| OPERATION ID | OPERATION | OPERATION COMMAND |
|---|---|---|
| OPERATION 1 | DATA BACKUP WORK | [ "get snapshot" , …] |
| . . . | . . . | . . . |

FIG. 6B

ORGANIZATION 1

| OPERATION ID | OPERATION EXECUTION ID | EVIDENCE | Salt | EVIDENCE HASH VALUE |
|---|---|---|---|---|
| OPERATION 1 | 1 | {RESULT: SUCCESSFUL, EXECUTION LOG: "SUCCEEDED IN BACKING UP DATA A, B, AND C."} | abcdef | xyzxyz |
| . . . | . . . | . . . | . . . | . . . |

FIG. 6C

ORGANIZATION 2

| OPERATION ID | OPERATION EXECUTION ID | EVIDENCE | Salt | EVIDENCE HASH VALUE |
|---|---|---|---|---|
| OPERATION 1 | 1 | {RESULT: FAILURE, EXECUTION LOG: "FAILED IN BACKING UP DATA B."} | nngxea | xyznnz |
| . . . | . . . | . . . | . . . | . . . |

FIG. 6D

| OPERATION ID | OPERATION EXECUTION ID | ORGANIZATION ID | EVIDENCE HASH VALUE | Salt | EVIDENCE |
|---|---|---|---|---|---|
| OPERATION 1 | 1 | ORGANIZATION 1 | xyzxyz | abcdef | {RESULT: SUCCESSFUL, EXECUTION LOG: "DATA A... |
| OPERATION 1 | 1 | ORGANIZATION 2 | xyznnz | — | — |
| OPERATION 1 | 1 | ORGANIZATION 3 | xyzzzz | — | — |

FIG. 6E

| OPERATION ID | OPERATION EXECUTION ID | TOTALING RESULTS | EVALUATION |
|---|---|---|---|
| OPERATION 1 | 1 | {ORGANIZATION 2 HAS FAILED IN EXECUTING OPERATION.} | FAILURE |
| OPERATION 1 | 2 | {ALL ORGANIZATIONS HAVE SUCCEEDED IN EXECUTING OPERATION, SHOWING THE SAME SUCCESSFUL RESULTS.} | SUCCESSFUL |

EVIDENCE MANAGEMENT METHOD, EVIDENCE MANAGEMENT SYSTEM, AND NODE

CROSS-REFERENCE TO RELATED APPLICATION

This application claims priority pursuant to Japanese patent application No. 2022-007174, filed on Jan. 20, 2022, the entire disclosure of which is incorporated herein by reference.

BACKGROUND

Technical Field

The present invention relates to an evidence management method, an evidence management system, and a node.

Related Art

A distributed ledger technology has been known for years as a technology by which transactions having been executed through financial institutions or trustworthy centralized governmental bodies are executed directly by users as peer-to-peer (P2P) transactions.

For example, "A Peer-to-Peer Electronic Cash System", [online], Internet resource found on Mar. 31, 2017 at <URL: https://bitcoin.org/bitcoin.pdf>, discloses a technology by which a settlement transaction is carried out by using a virtual currency to eliminate the need of a mediating centralized body, such as a bank. In such a virtual-currency-based system, the validity of transaction data (hereinafter, referred to also as "transaction") on a deal by a node, which is called miner on a P2P network, is determined and then specific hash value calculation, which is called proof of work, is carried out to confirm the transaction. Confirmed transactions are grouped into one block, which is then recorded on a distributed ledger called blockchain (hereinafter, referred to also as "BC").

In recent years, the BC that is implemented based on the technology disclosed in "A Peer-to-Peer Electronic Cash System", [online], Internet resource found on Mar. 31, 2017 at <URL: https://bitcoin.org/bitcoin.pdf>, has led to proposal of various derivative technologies related to the BC and the distributed ledger, allowing the distributed ledger technology to continue to evolve.

The current BC offers the following main features: (1) a transaction between participants on a distributed ledger network is confirmed not through mediation of a centralized organization but through consensus making and approval by participants (any given participants or specific participants); (2) a plurality of transactions are grouped into a block, and such blocks are recoded as a chain of blocks in a distributed ledger, where hash calculation is carried out on a series of blocks to make data falsification virtually impossible; and (3) all participants share the same ledger data and are therefore able to check their transactions.

Such a distributed ledger technology including the BC, because of its features described above, is now recognized as a technology to create a system that manages/shares data in a reliable manner and executes/manages contract-based transactions, and application of the technology to a wide variety of fields, such as financing and Internet of Thing (IoT), has been under discussion.

Using a base for providing a distributed ledger (hereinafter, "distributed ledger base") allows a plurality of entities to share information and execute transactions without management by a centralized organization (e.g., a consortium in a specific industry, a group of companies related to a supply chain, and so on).

Hereinafter, a network configured by participants (and their nodes) to a distributed ledger will be referred to as a distributed ledger network.

The distributed ledger can be applied not only to simple transactions using a virtual currency, such as those described in "A Peer-to-Peer Electronic Cash System", [online], Internet resource found on Mar. 31, 2017 at <URL: https://bitcoin.org/bitcoin.pdf>, but also to transactions involving complicated transaction conditions and various applications. To offer this advantage, the distributed ledger allows not only management of (transaction) data but also management of logics. Such a logic is called smart contract (hereinafter, referred to also as "SC").

For example, NPL 2 and NPL 3 disclose a technology related to a distributed ledger base having a function of executing such a SC. The distributed ledger base accepts a transaction (hereinafter, referred to also as "TX") while carrying out consensus making between nodes at a given consensus level, and executes the TX at each node, thereby allowing a plurality of nodes to share information.

The distributed ledger base has also a smart contract (SC) execution function of executing a predetermined logic on a TX.

Typical forms of application of the distributed ledger technology include a public type in which numbers of unspecified calculation resources (nodes) form a distributed ledger network, as do in the BC described in "A Peer-to-Peer Electronic Cash System", [online], Internet resource found on Mar. 31, 2017 at <URL: https://bitcoin.org/bitcoin.pdf>, and includes also a permission type in which nodes between specific companies/organizations form a distributed ledger network. This permission type is considered to be particularly promising among enterprises.

Between a plurality of organizations participating to such a permission type BC, nodes are allowed to automatically execute their respective transactions according to pre-arranged and coded contract contents (SC) while synchronizing and coordinating with each other, based on a distributed consensus protocol.

It is assumed that a system built by using the distributed ledger technology (hereinafter, "distributed ledger system") is put into practical use in a use case where evidences are shared between organizations and shared evidences collected are compared and totaled. In such a use case, the transparency of evidence handling can be ensured, and therefore an enterprise type BC can be applied to this case.

One of more specific use cases is a case of operation management across different organizations, in which case pieces of information, i.e., evidences from individual participants are compared and totaled, the information and evidences being about voting for a governance purpose or a repost on a system operation status. There may be still another case where pieces of information on bids on auctioned articles, real estate, construction work, and the like are compared and totaled.

In these use cases, to ensure the transparency of evidence management/handling, evidences may be or should preferably be made opened finally to individual participants. It is, however, undesirable that evidences are made opened to participants in the middle stage of evidence management before being compared or totaled.

As a conventional technique related to evidence handling, for example, a technique has been proposed, according to which in a distributed ledger system administrated by multiple administrators, system operation management can be carried out with management policies/timing made uniform between nodes (see JP 2019-28525 A).

According to this technique, in a distributed ledger system including a plurality of nodes, at least a given group of nodes among the plurality of nodes each manage an operation smart contract for operation/management of the distributed ledger system, based on a distributed ledger, and when at least one node among the given group of nodes receives a transaction, the node having received the transaction determines whether the type of the transaction is the operation smart contract and based on a result of the determination, executes the operation smart contract.

A consortium blockchain system using an encryption method that does not require a pairing operation (see JP 2021-64891 A) has also been proposed.

This technique, i.e., the consortium blockchain system includes a first computer that holds transaction data and a generation key for generating a zero knowledge proof value; and a second computer that holds a verification key for verifying the zero knowledge proof value. The first computer generates a zero knowledge proof value based on the transaction data, using the generation key, and transmits the generated zero knowledge proof value to the second computer, while the second computer verifies the zero knowledge proof value transmitted from the first computer, using the verification key, receives the transaction data, and, based on a result of verification of the zero knowledge proof value, approves or rejects a transaction indicated by the transaction data.

The technique described in JP 2019-28525 A discloses a means by which operation evidences are collected from each organization, using the BC. The technique, however, is implemented on the assumption that the evidences are constantly made open to all organizations according to the characteristics of the BC.

JP 2021-64891 A discloses the technique using zero knowledge proof, i.e., a protocol by which one can prove the one's own proposition (proposition related to confidential information) to be true without conveying any other knowledge when proving that the proposition is true. This is a useful technique for sure but is nevertheless a technique still in the developing stage. Currently, adopting this technique as a practical solution is premature.

However, Hyperledger Fabric has a function called private data, and this function allows an operation of storing a hash value for confidential information (i.e., the above-mentioned evidence) in a specific small group in the BC. However, in the case of confidential information to which only the owner of the information is accessible, a third party cannot confirm the authenticity of the information and the correctness of handling the information. The private data function, therefore, cannot be directly applied to evidence totaling across organizations or the like.

SUMMARY

An object of the present invention is to provide a technique by which, in carrying out transparent and appropriate collection/totaling of evidences across organizations, timing of making an evidence open to the public between organizations can be controlled in a non-centralized manner.

An evidence management method of the present invention for solving the above problem is carried out in a distributed ledger system including nodes of a plurality of organizations. According to the method, a smart contract of each of the organizations refers to information made open to the public in a public area, the information being related to an evidence held in a private area of each of the plurality of organizations, and in response to a trigger event of the information's meeting a given condition, executes a process of making the evidence open to the public in the public area, the evidence being held in the private area of an organization to which the smart contract belongs.

It should be noted that the above private area means a state in which data can be held as a data that a different organization cannot refer to, while the public area means a state in which data can be held as data that a different organization can refer to. These private area and public area are not defined for an intention of exclusively referring to specific storage areas provided by setting aside data storage places or devices.

An evidence management system of the present invention is a distributed ledger system including nodes of a plurality of organizations. In the system, a smart contract of each of the organizations refers to information made open to the public in a public area, the information being related to an evidence held in a private area of each of the plurality of organizations, and in response to a trigger event of the information's meeting a given condition, executes a process of making the evidence open to the public in the public area, the evidence being held in the private area of an organization to which the smart contract belongs.

A node of the present invention is one of nodes of a plurality of organizations making up a distributed ledger system. The node holds a smart contract that refers to information made open to the public in a public area, the information being related to an evidence held in a private area of each of the plurality of organizations, and that in response to a trigger event of the information's meeting a given condition, executes a process of making the evidence open to the public in the public area, the evidence being held in an organization to which the smart contract belongs.

According to the present invention, in carrying out transparent and appropriate collection/totaling of evidences across organizations, timing of evidence disclosure between organizations can be controlled in a non-centralized manner.

BRIEF DESCRIPTION OF THE DRAWINGS

FIG. 4 depicts an example of a data structure of state information on the distributed ledger;

FIG. 5A depicts an example of an evidence held in a private area, the evidence being related to electronic named voting;

FIG. 5B depicts an example of an evidence held in the private area, the evidence being related to electronic named voting;

FIG. 5C depicts an example of evidence information made open to the public in the public area, the evidence information being related to electronic named voting;

FIG. 5D depicts an example of a totaling result made open to the public in the public area, the totaling result being related to electronic named voting;

FIG. 6A depicts an example of an operation work definition held in the public area, the operation work definition being related to an operation execution history;

FIG. 6B depicts an example of an evidence held in the private area, the evidence being related to an operation execution history;

FIG. 6C depicts an example of an evidence held in the private area, the evidence being related to an operation execution history;

FIG. 6D depicts an example of evidence information made open to the public in the public area, the evidence information being related to an operation execution history;

FIG. 6E depicts an example of a totaling result made open to the public in the public area, the totaling result being related to an operation execution history;

DETAILED DESCRIPTION OF THE EMBODIMENTS

<Overview>

Figure 1:
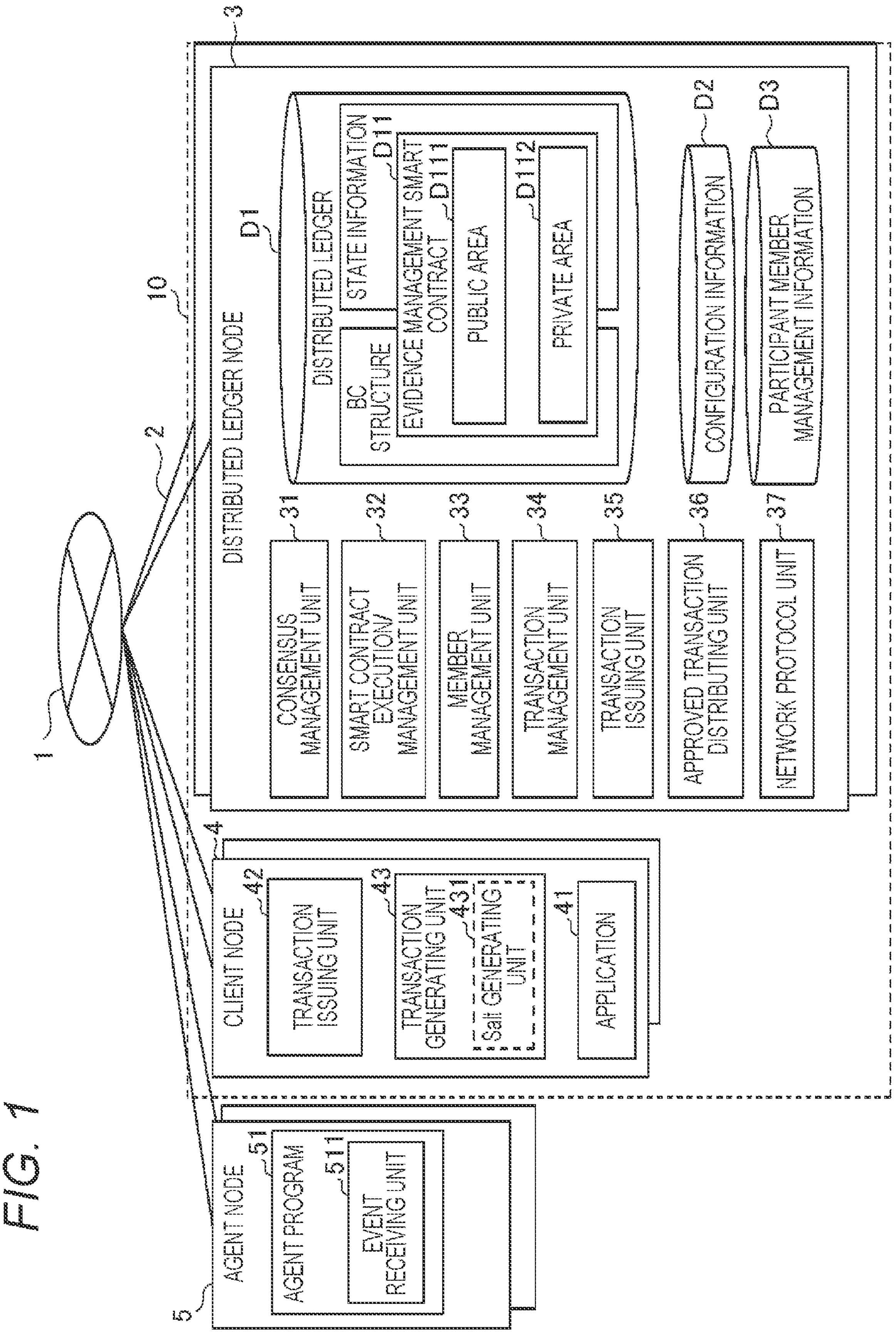
FIG. 1 depicts a configuration example of a computer system according to the present embodiment.

FIG. 1 depicts a configuration example of a computer system according to the present embodiment, the configuration example including a distributed ledger system 10 and an agent node 5. The present embodiment is implemented on the assumption that the distributed ledger system 10 needs to collaborate with the agent node 5. In this collaboration, a plurality of connection paths between the distributed ledger system 10 and the agent node 5 are prepared so that collaboration between the distributed ledger system 10 and the agent node 5 does not depend on a path provided by a single organization.

In accordance with the status of holding evidences of a plurality of organizations, the evidences being related to given operations, such as system operation, electronic voting, and bidding, an evidence held in a private area of each organization is automatically transferred to a blockchain (hereinafter, "BC"), which is a public area. A method of this automatic transfer of the evidence is defined as an evidence management smart contract (hereinafter, "evidence management SC").

When an execution TX of an evidence management SC is issued as an evidence open-to-public start request, to each of distributed ledger nodes 3 that, together with the client node 4, makes up the distributed ledger system 10, the evidence management smart contract, through the distributed ledger system 10, refers to information made open to the public in the BC which is a public area D111, the information being related to an evidence held in a private area D112 in a distributed ledger D1 of each organization, according to evidence open-to-public rules defined in an evidence management SC_D11, and in response to a trigger event of the information's meeting a given condition, executes a process of making the evidence open to the public in the BC (public area D111), the evidence being held in the private area D112 of a principal organization the distributed ledger node 3 belonging to.

Now processes carried out in the present embodiment are summarized as follows.

1. The evidence management SC is placed on the distributed ledger D1. The evidence management SC includes the following definitions. A) A definition of a condition for starting evidence open-to-public, and B) a definition of an evidence totaling method (e.g., totaling logic)

2. The evidence management SC refers to information (e.g., an organization ID and a hash value created by combining an evidence obtained by the organization and Salt) made open to the public in the public area D111, the information being related to an evidence held in the private area D112 of the distributed ledger node 3 of each organization, and in response to a trigger event of a condition being met, the condition being that the information on the evidence is made open to the public by a given number of or more of organizations, issues an event of open-to-public starting of the evidence in order to make the evidence open to the public in the public area D111, the evidence being held in the private area D112 of an organization to which the evidence management SC belongs.

3. After issuing the event of open-to-public starting, the evidence management SC rejects making the information on the evidence open to the public in the public area D111 or updating the information. Otherwise, the evidence management SC adds information at a timing of being made open to the public or updated after issuance of the event of open-to-public starting, to the information on the evidence.

4. The evidence management SC executes evidence totaling, using evidences of organizations made open to the public in the public area D111.

5. In response to a trigger event of evidence open-to-public starting, the evidence management SC issues a provisional event of evidence open-to-public starting.

6. When each organization makes its evidence open to the public in the public area D111 and consequently the status of making the evidence open to the public meets a given condition, the evidence management SC issues a provisional event of data processing starting.

Processes involved in collaboration between the distributed ledger system 10 and the agent node 5 are as follows.

1. When the smart contract issues an event of open-to-public starting of the evidence, which is a process of making an evidence open to the public, the agent node 5 receives the event, and executes a process of making the evidence open to the public in the public area D111.

2. When making the evidence open to the public, the agent node 5 executes the process of making the evidence open to the public and data processing on a subgroup consisting of a given number of organizations, the sub-group being generated under a preset condition (which is set, for example, for each evidence management SC or number of times of totaling), and makes a result of the data processing open to other subgroups. The agent node 5 further carries out data processing, using totaling results in the subgroup. These processes may be carried out as a multiple stages of processes or carried out collectively on the entire organizations without processing on the subgroup.

3. When the smart contract issues a provisional event of evidence open-to-public starting in response to such a trigger event that the number of organizations have recorded information on an evidence in the public area, the information being recorded as a process of making the evidence open to the public, reaches a certain number or more, the agent node 5 receives the provisional event, confirms the evidence open-to-public starting following consensus making between organizations, and issues an event of open-to-public starting.

4. Likewise, when the smart contract issues a provisional event of data processing starting in response to an event that as a result of each organization's making an evidence open to the pubic in the public area D111, the number of organizations having made their evidences open to the public in the public area reaches a given number or more, that is, the status of making an evidence open to the pubic meets a given condition, the agent node 5 receives the provisional event, and carries out data processing following consensus making between a plurality of organizations.

Network Configuration Example

A configuration of a computer system assumed to be used in the present embodiment will hereinafter be described with reference to FIG. 1. The computer system shown in FIG. 1 includes one or more distributed ledger nodes 3, one or more client nodes 4, and an agent node 5. These nodes, i.e., devices are connected to a network 1 through a physical communication line 2.

The distributed ledger node 3 includes a consensus management unit 31, a smart contract execution/management unit 32 (hereinafter, referred to also as "SC execution/management unit 32"), a member management unit 33, a transaction management unit 34, a transaction issuing unit 35, an approved transaction distributing unit 36, a network protocol unit 37, a distributed ledger D1, configuration information D2, and participant member management information D3.

The distributed ledger node 3 receives a TX, through the function of the transaction management unit 34, and makes a consensus with a different node on whether it is all right to receive the TX, through the function of the consensus management unit 31. When having made the consensus, the distributed ledger node 3 deploys a SC and executes the deployed SC, through the function of the SC execution/management unit 32, and records a TX history and a result of TX execution in the distributed ledger D1.

It is not always necessary that all distributed ledger nodes 3 carry out consensus making and SC execution. Some distributed ledger nodes 3 may carry out consensus making and SC execution and distribute results thereof to other nodes (rules to follow in carrying out this process depends on a consensus making algorithm).

The approved transaction distributing unit 36 provides a function of distributing results of consensus making and SC execution (specifically, a TX history and a result of TX execution) to distributed ledger nodes 3 having not participated in consensus making and SC execution.

Communication between distributed ledger nodes 3, such as consensus making between distributed ledger nodes 3 and distribution of an approved TX, is carried out through the function of the network protocol unit 37.

The transaction management unit 34 of the distributed ledger node 3 provides a function/interface for accepting a TX and acquiring/perusing TX history information in response to a request from each node, such as the client node 4.

It should be noted that in the present embodiment, the distributed ledger node 3 (its transaction issuing unit 35 having received a TX issue instruction from the evidence management SC D11) and the client node 4 (its transaction issuing unit 42) can issue a TX.

In addition, the member management unit 33 of the distributed ledger node 3 provides a function of issuing a membership of a newcomer to the distributed ledger network (distributed ledger system) and authenticating the membership. It is assumed that the member management unit 33 supervises authentication of a participant organization and members belonging to the organization, signing a TX, SC execution authorization, and the like, using a pair of a secret key and a public key. Such key information related to member management is stored and managed in the participant member management information D3.

Upon receiving a TX, the transaction management unit 34 properly checks the TX to determine whether a TX issuer is a genuine authorized participant, through the function of the member management unit 33. Since such functions are implemented by known techniques, detailed description of the functions will be omitted.

The configuration information D2 includes information on organizations making up the distributed ledger network and members (including nodes, administrators, users, etc.) belonging to the organizations, the information being stored and managed as the configuration information D2. It is assumed in the present embodiment that this information is managed by functional units of the distributed ledger node 3 (e.g., by the member management unit 33 and the network protocol unit 37), and each node holds the information.

The distributed ledger D1 stores and manages ledger information related to the evidence management smart contract D11. It is assumed in the present embodiment that the distributed ledger D1 has a data structure in which TX histories are recorded in the BC and state information based on TX execution results is held in a table. In the table (internal table), values are held in the form of key-value sets.

However, the ledger information related to the evidence management smart contract D11 is held and managed in one of two areas, i.e., either the public area D111 or the private area D112, and the public area D111 is equivalent to the BC. In the public area D111, information on an evidence defined in the present embodiment (e.g., a hash value for a combination of an evidence and Salt) is stored as information associated with an organization ID.

The private area D112, on the other hand, is a storage area in which data securely managed by an organization who runs the distributed ledger node 3 is stored. In other words, the private area D112 is an area in which the evidence itself according to the present embodiment is stored. To put it in another way, the data is held in the private area D112 in a state of not allowing reference to the data by other organizations. This data storage condition can be achieved by various methods. If such private data is managed by each organization and can be made open to the public through the evidence management smart contract D11, the private data may be present outside the distributed ledger D1. In the case of Hyperledger Fabric, for example, its private data function may be used to create private data that can be accessed solely by a single organization. In another case, the private data may be stored in a storage present outside the distributed ledger D1 prepared for each organization. A combined method may also be adopted, according to which the private data is encrypted first, using a secret key unknown to a different organization, and is stored in the public area, and then the secret key is disclosed to the different organization later.

The client node 4 includes the transaction issuing unit 42, a transaction generating unit 43, and a business application 41.

A user or a provider of the evidence management smart contract D11 generates a TX through the transaction generating unit 43 of the client node 4, and issues the generated TX through the transaction issuing unit 42, thereby transmitting the TX to the distributed ledger node 3. The TX is given issuer information, and authentication information (secret key) issued by the participant member management information D3 is used as the issuer information.

Figure 11:
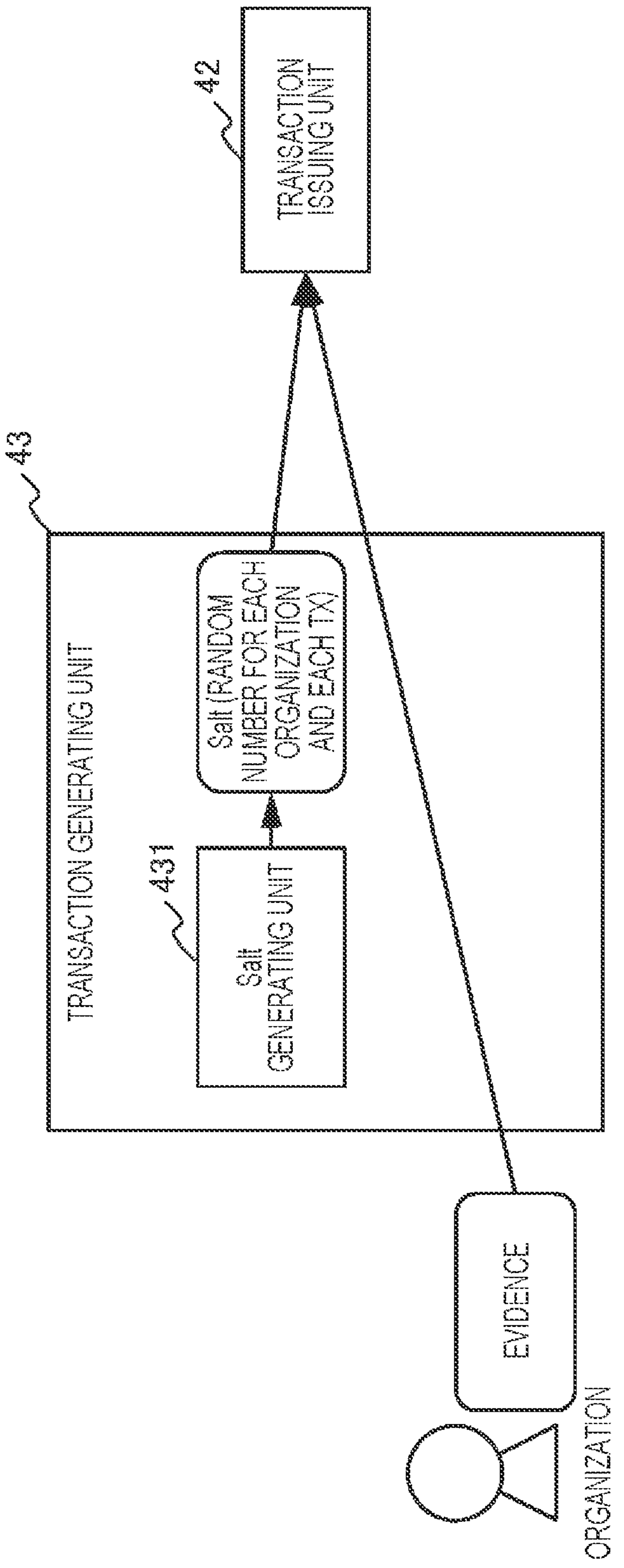
FIG. 11 depicts a concept of a salt generation method according to the present embodiment.

The TX issued at the client node 4 includes a hash value, which is created by giving a combination of a random number for each organization, the random number being generated by a Salt generating unit 431, and an evidence held in the private area D112 of the organization, to a hash function, and the ID for the organization (see FIG. 11).

The business application 41 issues TXs related to various operations, such as electronic voting and bidding, the TXs being handled by the evidence management smart contract D11, through the transaction issuing unit 42, thereby executing/managing business operations.

It is assumed in the present embodiment that a plurality of distributed ledger nodes 3 are present and the distributed ledger nodes 3 are managed respectively by a plurality of organizations (e.g., business operators and vendors). It is also assumed that a plurality of client nodes 4 are present and users of a plurality of organizations use different client nodes 4, respectively.

Through an event receiving unit 511 of an agent program 51, the agent node 5 receives various events (TXs resulting from events), such as an event of open-to-public starting, issued by the evidence management smart contract D11 of the distributed ledger node 3.

Receiving an event of open-to-public starting issued by the evidence management smart contract D11, for example, the agent program 51 of the agent node 5 automatically transfers an evidence in an organization to which the agent node 5 belongs, to the public area D111, where the evidence is made open to the public.

When making the evidence open to the public, the agent program 51 of the agent node 5 uses a subgroup consisting of a given number of organizations including the organization to which the agent node 5 belongs, to execute a process of making the evidence open to the public and data processing within the subgroup, and makes results of the data processing open to other subgroups.

Receiving a provisional event of evidence open-to-public starting issued by the evidence management smart contract D11, the agent program 51 of the agent node 5 confirms the open-to-public starting of the evidence following consensus making between the organizations making up the distributed ledger system 10, and issues an event of open-to-public starting.

Receiving a provisional event of data processing starting, i.e., start of data processing on an evidence, the event being issued by the evidence management smart contract D11, the agent program 51 of the agent node 5 carries out data processing on the evidence following consensus making between organizations making up the distributed ledger system 10. The agent program 51 of the agent node 5 transmits a result of the data processing to the client node 4 or the distributed ledger node 3 of the organization to which the agent node 5 belongs. The client node 4 or the distributed ledger node 3 issues a TX including the result of the data processing, and stores the TX in the public area D111 of the distributed ledger D1.

<Hardware Configuration>

Figure 2:
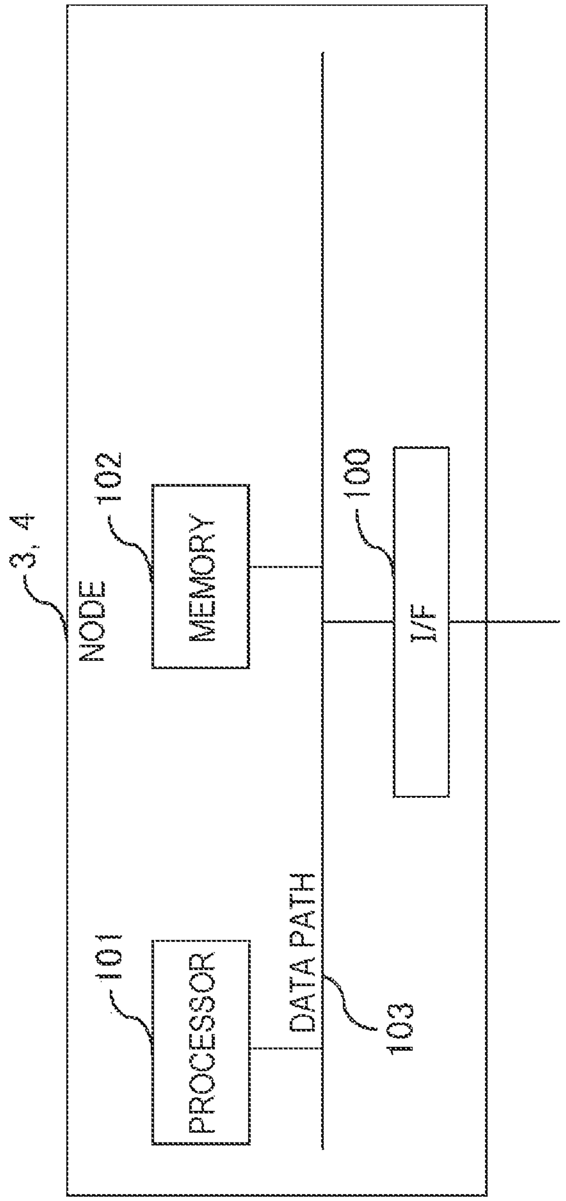
FIG. 2 is a block diagram of a physical configuration example of a node according to the present embodiment.

FIG. 2 is a block diagram showing a physical configuration of the distributed ledger node 3 or the client node 4 or the agent node 5 according to the present embodiment. A configuration of the distributed ledger node 3 will be described exemplary.

The distributed ledger node 3 is a computer including an interface (I/F) 100, a processor 101, and a memory 102. The I/F 100, the processor 101, and the memory 102 are interconnected through a data bus 103.

The distributed ledger node 3 communicates with the network 1 via the I/F 100. The processor 101 is an arithmetic unit, such as a CPU. The memory 102 is a storage area that holds programs and data therein.

The processor 101 reads a program from the memory 102 via the data bus 103, and executes the program to implement necessary functions. The functions correspond to the consensus management unit 31 to the network protocol unit 37 and other units described above.

Data Configuration Examples

Figures 3, 3A:
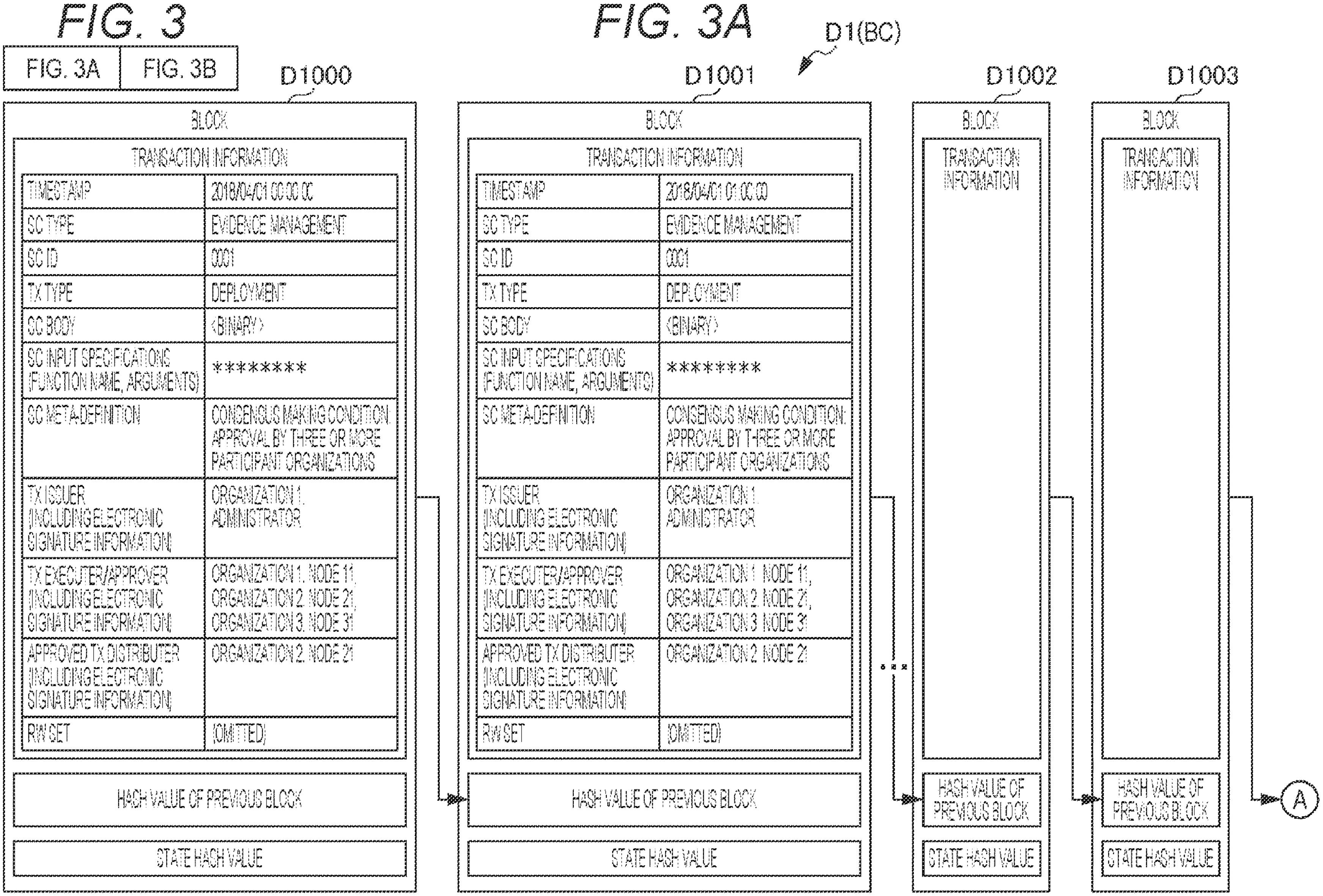
FIGS. 3A and 3B depict an example of a data structure of a blockchain on a distributed ledger.
Figure 3B:
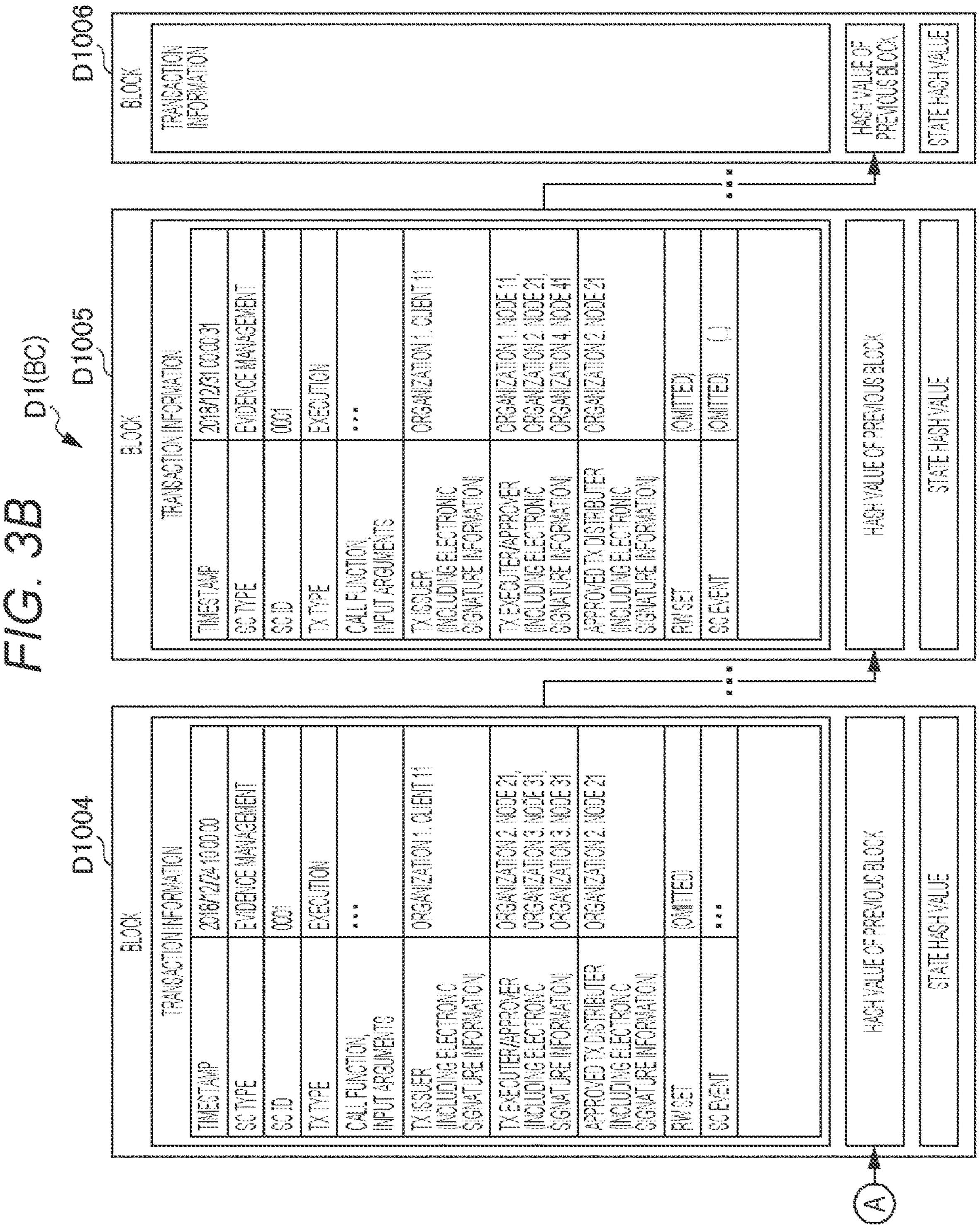

FIGS. 3A, 3B and 4 depict examples of data structures stored in the distributed ledger D1. FIGS. 3A and 3B are examples of the BC which is one of data structures managed on the distributed ledger D1.

According to distributed ledger management using the BC, a plurality of TXs are arranged as a group of blocks in which each block has a hash value of the previous block. In this data structure, a series of data are managed as a chain of data. Changing the value of the previous block even by one bit results in a change in the hash values of the entire blocks to follow. This makes data falsification difficult.

In the present embodiment, for simpler description, one TX is included in one block. The present invention, however, apply also to a case where a plurality of TXs are grouped into one block.

FIGS. 3A and 3B show a series of blocks D1000 to D1006 chained to each other. Each block includes TX information indicating either deployment of the evidence management SC_D11 or execution of the evidence management SC_D11. Each block includes a hash value of the previous block, and includes also a hash value generated from state information, which will be described later.

In the data structure described above, TX histories indicating deployment or execution of the evidence management SC_D11 are managed as a chain of data in the BC.

The block D1000 among the above blocks is an example of a block storing a deployment TX indicating deployment of the evidence management SC_D11. Such a deployment TX block includes a timestamp indicating a time at which a TX is issued, an SC type for specifying the type of a smart contract, an SC_ID for uniquely identifying the smart contract, a TX type for specifying the type of the TX as deployment or execution or reference, and a smart contract body (e.g., executable binary). The block further includes SC input specifications for the user to check to know a function and arguments of the function included in the smart contract.

The block further includes an SC meta-definition, which represents parameters determined according to input arguments specified at the time of deployment, such as consensus making conditions at execution of the evidence management SC_D11 (e.g., accepting a TX approved by three or more organizations for the case of a normal SC function, accepting a TX approved by one or more organizations for the case of an SC function involving data writing to the private area), and various pieces of definition information.

The deployment TX block includes also information on a TX issuer who has issued the TX defined in the block. Information on the TX issuer includes the member ID for the issuer, the original place where the TX has been issued, and an electronic signature used to verify that data is not falsified.

This electronic signature is generated by using a secret key of each network participant member, i.e., a provider or user of the evidence management SC, the secret key being issued by the member management unit 33, and can be verified by using a public key paired with the secret key.

In addition to the information on the TX issuer, the block further includes information on a TX executer/approver (that is, information on a participant who has been involved in consensus making and SC execution through the consensus management unit 31 and the SC management/execution unit 32) and on an approved TX distributer (that is, information on a participant who has been involved in a distribution process carried out by the approved TX distributing unit 36).

The block further includes information on a read-write (RW) set which is state information having been referred to/updated by the TX.

The block D1004 in the BC of FIG. 3B is an example of a block storing an execution TX indicating execution of the evidence management SC_D11. An execution TX block of the present embodiment is similar in basic structure to the deployment TX block. The execution TX block, however, does not include the SC body and the SC input specifications, and, instead, includes information on an SC function to be called and arguments to be inputted.

The above RW set represents the state information having been referred to/updated at deployment or execution of (a function of) the evidence management SC_D11, and includes an SC_ID, "RW classification" for identifying access to the state information as reference (reading) or updating (writing), and key data and value data of the state information.

In this manner, by managing/saving a result of execution of the TX in the form of the RW set, a result of execution of the SC can be known without actually executing the SC. This allows a node having not executed the SC to share the result of execution of the SC, which makes processing efficient.

FIG. 4 is a configuration example of the state information managed on the distributed ledger D1. In distributed ledger management using the BC, to acquire a (latest) state (e.g., a balance in the account in the case of a virtual currency system), it is usually necessary to trace the BC. Such a case leads to low processing efficiency. To avoid this, a method of caching the latest state information as separate information to the BC is provided.

It is assumed in the present embodiment that the latest state information is held. In the present embodiment, a state data area is prepared for each evidence management SC_D11.

The state information holds an SC_ID and an SC body. As a result, the SC execution/management unit 32 is able to acquire and execute the SC body, using the SC_ID as a key.

The state information further includes an internal table D1104 that holds results of execution of the evidence management SC_D11. The content of the internal table D1104 is updated every time a TX is executed. In this state information, information on the evidence management SC_D11 is stored.

Paying attention to the internal table D1104 of D1110 reveals that the internal table D1104 corresponds to the RW set described with reference to FIGS. 3A and 3B and that the internal table D1104 holds the latest state reflecting the entire content of the RW set. In a typical data storage example, data is held in a key-value-pair format as shown in the internal table D1104. In the internal table D1104, however, structured data written in the JavaScript Object Notation (JSON) may be stored in a value data column. In such a case, a table of any given data scheme can be held.

Furthermore, if a proper key data structure is designed, a plurality of tables (tables of data different in data scheme from each other) can be virtually managed in the internal table. The internal table related to the evidence management SC_D11, which will be described later, shows a case where structured data is stored in the value column and, for simpler description, a key-value version and the like are omitted from the table.

FIG. 4 shows an example of the internal table D1104 holding information on an evidence made open to the public in the public area D111 (BC), on an evidence held in the private area D112, and on evidence totaling results made open to the public in the public area D111 (BC).

Specific examples of the above-described state information will be described with reference to FIGS. 5A to 5D and FIGS. 6A to 6E. FIG. 5A depicts an example of an evidence held in the private area D112 in the distributed ledger node 3 of an "organization 1", and FIG. 5B depicts an example of an evidence related to an "organization 2".

These examples show state information indicating results of electronic named voting that members of organizations making up the distributed ledger system 10 have performed over a subject common to each organization, the results being managed as evidences.

Each evidence has a data structure in which a voting ID that uniquely identifies the voting subject, the voting ID serving as a key, is associated with a voting result (for/against), i.e., the evidence itself, Salt, and an evidence hash value, which serve as values. Salt is generated by the Salt generating unit 431 of the client node 4, is issued as a Salt-based transaction, and is held by the evidence management SC_D11. The evidence hash value is created by giving a combination of the evidence and the value of the Salt to a hash function. The hash function is held by the evidence management SC_D11 in a readily available manner.

FIG. 5C depicts an example of information on an evidence, showing results of voting by organizations over a subject "voting 1", the results being made open to the public in the public area D111 in the distributed ledger D1 of the distributed ledger node 3. The evidence has a data configuration in which a voting ID that uniquely identifies the voting subject, the voting ID serving as a key, is associated with an organization ID that identifies a voting organization, an evidence hash value, Salt, and an evidence, which serves as values.

Among these values, however, the Salt and the evidence are not included in the state information stored in the public area D111 before evidence open-to-public starting. The example of FIG. 5C indicates a state in which after evidence open-to-public starting, automatic transfer of an evidence of the "organization 1" from the private area D112 to the public area D111, the evidence being related to the "voting 1", has been completed. In other words, at this point of time, automatic transfer of evidences of an "organization 2" and an "organization 3" to the public area D111 is not completed yet.

FIG. 5D shows an example of totaling results representing totals of evidence values automatically transferred to the public area D111. FIG. 5D shows a case where voting over the subject "voting 1" gives a result "for: 10, against: 3, abstention: 2" and therefore the subject is "approved" by a majority in favorable votes, and a case where voting over a subject "voting 2" gives a result "for: 3, against: 7, abstention: 2, no voting: 3" and therefore the subject is "rejected" by a majority in unfavorable votes.

FIG. 6A shows an example of a definition of system operation work carried out by an organization, i.e., an example of an operation work definition. The operation work definition has a data structure in which an operation ID that uniquely identifies an operation type, the operation ID serving as a key, is associated with an operation (operation details), and an operation command, which serves as values.

FIG. 6B depicts an example of an evidence held in the private area D112 in the distributed ledger node 3 of the "organization 1", and FIG. 6C depicts an example of an evidence related to the "organization 2".

Each evidence has a data structure in which an evidence representing a history of system operation work carried out by the organization is saved as state information. In this data structure, an operation ID, which serves as a key, is associated with an operation execution ID that uniquely identifies a history of operation work, an evidence, Salt, and an evidence hash value, which serves as values. The evidence defined in this data structure includes values representing execution results and execution logs of operation work, such as a data backup.

The Salt is generated by the Salt generating unit 431 of the client node 4, is issued as a Salt-based transaction, and is held by the evidence management SC_D11. The evidence hash value is created by giving a combination of the evidence and the value of the Salt to a hash function. The hash function is held by the evidence management SC_D11 in a readily available manner.

FIG. 6D depicts an example of information on an evidence, showing each organization's operation performance in an operation related to a subject "operation 1", the operation performance being made open to the public in the public area D111 in the distributed ledger D1 of the distributed ledger node 3. The evidence has a data configuration in which an operation ID that uniquely identifies an operation type, the operation ID serving as a key, is associated with an operation execution ID, an organization ID, an evidence hash value, Salt, and an evidence, which serves as values.

Among these values, however, the Salt and the evidence are not included in the state information stored in the public area D111 before evidence open-to-public starting. The example of FIG. 6D indicates a state in which after evidence open-to-public starting, automatic transfer of an evidence of the "organization 1" from the private area D112 to the public area D111, the evidence being related to the "operation 1", has been completed. In other words, at this point of time, automatic transfer of evidences of an "organization 2" and an "organization 3" to the public area D111 is not completed yet.

FIG. 6E shows an example of totaling results representing totals of evidence values automatically transferred to the public area D111. FIG. 6E shows a case where "the organization 2 has failed" in executing an operation identified by an operation execution ID "1" of the "operation 1" and therefore an evaluation result "failure" is saved, and a case where "all organizations have been successful and show the same successful result" in executing an operation identified by an operation execution ID "2" of an "operation 2" and therefore an evaluation result "successful" is saved.

The data structure of the configuration information D2 will be described without reference to drawings. The configuration information D2 stores information on organizations making up the distributed ledger network and on members belonging to the organizations (which include distributed ledger nodes 3, client nodes 4, the agent node 5, administrators, and users). The configuration information D2 has a data structure including these data values: a task D2000, an organization ID_D2001, and a member ID_D2002.

Among these data values, the task D2000 represents a group that carries out a specific task (system operation, electronic named voting, or the like) in the distributed ledger network. The organization ID_D2001 represents an organization participating to the distributed ledger network. The member ID_D2002 is information that identifies a member in a participant organization. Specifically, the member ID_D2002 is information that identifies an administrator, the distributed ledger node 3, the client node 4, the agent node 5, and a user. It should be noted that an organization does not necessarily have to have the distributed ledger node 3. The organization may be limited to a use case where it uses the distributed ledger system 10 via the client node 4.

<Member Registration>

An actual procedure of an evidence management method according to the present embodiment will then be described with reference to drawings. Various operations to be described below, the operations corresponding to the evidence management method, are carried out according to a program that a node making up the evidence management system 10 (the distributed ledger node 3 or the client node 4) or the agent node 5 reads from a memory and executes. The program is made up of codes for carrying out various operations described below.

Figure 7:
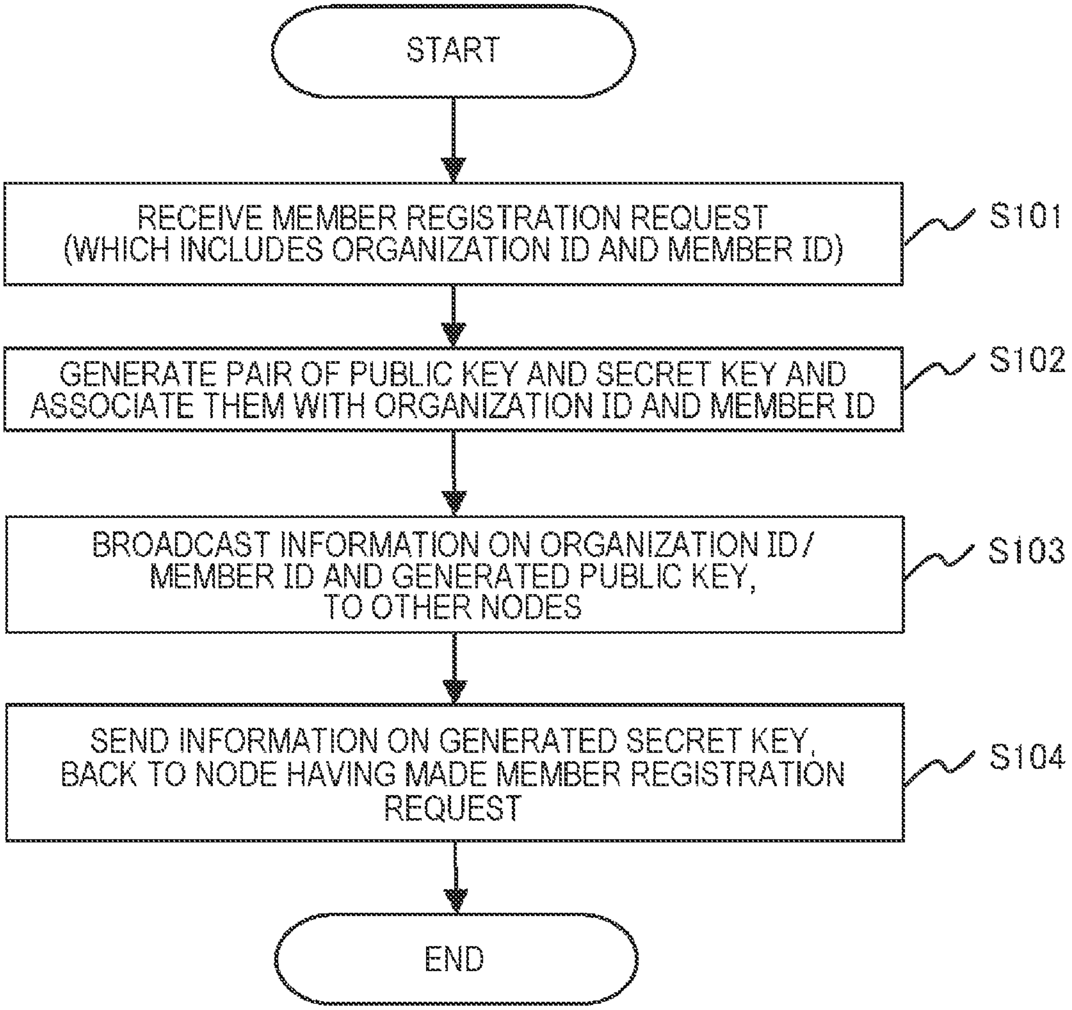
FIG. 7 depicts an example of a flowchart of an evidence management method according to the present embodiment.

A process flow according to the present embodiment will hereinafter be described. FIG. 7 is a flowchart showing an example of a process of registering a new participant member with the distributed ledger network.

The member management unit 33 of the distributed ledger node 3 receives a member registration request from a different node, such as the client node 4 (S101). In this case, the member registration request includes a member ID that uniquely identifies a member of which registration is requested.

Subsequently, the member management unit 33 generates a pair of a secret key D31 and a public key D32 by a known ordinary method, and associates the pair of keys with the member ID received at S101 (S102).

The member management unit 33 then broadcasts the member ID to be newly registered and the public key D32 generated at S102, to other nodes (S103).

Information on the broadcasted member ID and public key D32 is stored by each node, as the participant member management information D3.

The member management unit 33 then sends the secret key D31 generated at S102, to the node having made the member registration request (S104). Upon receiving the secret key D31, the node stores the secret key D31 in the participant member management information D3, as the secret key D31 the node possesses.

It is assumed in the present embodiment that using the pair of the secret key and the public key generated in the above manner, authentication of network participant members, putting a signature on a TX, and control of execution authority over the evidence management SC_D11 are carried out.

Specifically, for example, the client node 4 or the agent node 5 issues a TX carrying an electronic signature made by using the secret key issued, while the distributed ledger node 3, which is a verification node, verifies the electronic signature, using the public key. Through this process, the authenticity of a person having put the electronic signature can be confirmed.

Known techniques may be adopted as a method of generating a pair of a public key and a private key, a method of verifying an electronic signature, and a method of associating a key with an ID. In the present embodiment, therefore, these methods will not be described in detail.

In the present embodiment, the function of the member management unit 33 is described as a function in the distributed ledger node 3. However, a node having a dedicated member management function may be set up outside the distributed ledger node 3 and the node may offer the same function as that of the member management unit 33.

<Transaction Execution Process>

Figure 8:
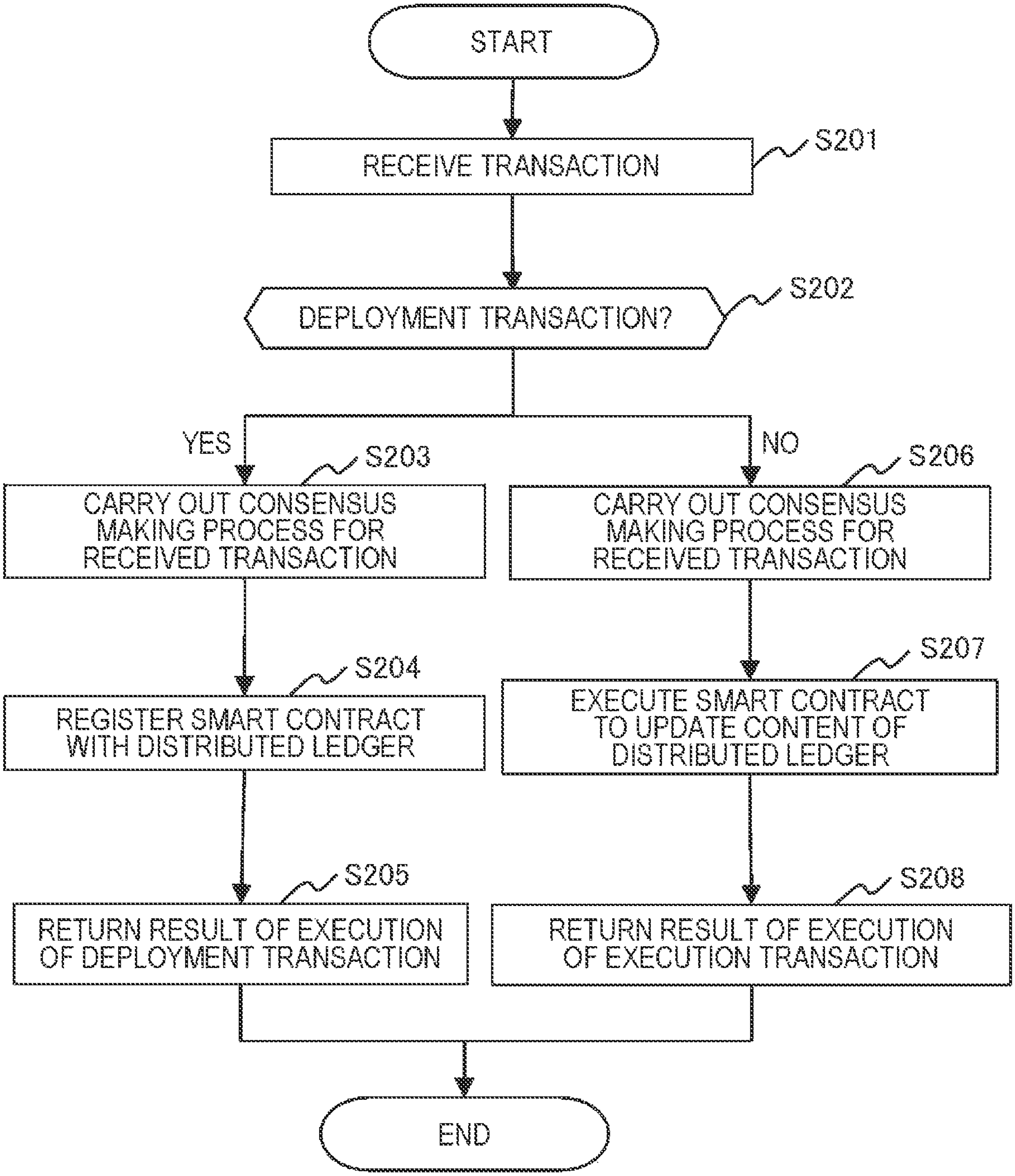
FIG. 8 depicts an example of the flowchart of the evidence management method according to the present embodiment.

FIG. 8 is a flowchart showing an example of a TX execution process, that is, an example of deployment and execution process of the evidence management SC_D11. The transaction management unit 34 of the distributed ledger node 3 receives a TX from the client node 4, etc., that is, a TX issuer (S201). The transaction management unit 34 then delivers the TX to the consensus management unit 31, which carries out deployment or execution process of the evidence management SC_D11, according to the type of the TX.

A case where the above TX received by the consensus management unit 31 is a deployment TX indicating deployment of the evidence management SC_D11 (a case where "YES" results at S202) will be described. In this case, the consensus management unit 31 carries out a consensus making process to reach a consensus with a distributed ledger node 3 different from the distributed ledger node 3 to which the consensus management unit 31 belongs, as to whether it is OK to execute the received TX or to add the received TX to the tail of a BC, as an additional block (S203). A known technique may be adopted as a specific method of the consensus making process.

For example, an algorithm called Practical Byzantine Fault Tolerance (hereinafter "PBFT") or the like may be adopted. This PBFT is an algorithm that requires consensus reaching between a certain number (⅔) or more of nodes among the entire nodes participating in the consensus making (i.e., verification nodes).

In another example, in a distributed ledger system described in "Hyperledger Fabric", [online], Internet resource found on Mar. 31, 2017 at <URL: https://hyperledger-fabric.readthedocs.io/en/latest/>, a consensus making algorithm called an Endorser-Orderer model is used. According to the Endorser-Orderer model, a TX is transmitted to a group of the distributed ledger nodes 3 selected as nodes having approval authority out of the entire distributed ledger nodes 3, and only the selected group of distributed ledger nodes 3 verify the TX to see if it has a problem, and upon confirming the TX's being problem-free, return an approval replay.

When a preset consensus making condition (e.g., approval by two or more organizations) is met, the TX is accepted. The accepted TX is then distributed to all distributed ledger nodes 3. The Endorser-Orderer model makes TX verification by all distributed ledger nodes 3 unnecessary, and is therefore more efficient than the PBFT.

A flow of processes to follow consensus making based the Endorser-Orderer model will be briefly described. The distributed ledger node 3 transmits the received TX to distributed ledger nodes 3 who are participates to the distributed ledger network and have TX approval authority.

Each distributed ledger node 3 having received the transmitted TX verifies a signature the TX carries to confirm that the TX is not falsified and that the content of the TX is valid.

The distributed ledger node 3 then sends confirmation results back to the above distributed ledger node 3 having transmitted the TX. The preset consensus making condition being met is considered to be completion of TX approval, and confirmation of the validity of the TX is considered to be completion of consensus making.

The consensus management unit 31 broadcasts the approved TX to every distributed ledger node 3, using the function of the approved TX distributing unit 36.

Upon receiving the broadcasted approved TX, the consensus management unit 31 of each distributed ledger node 3 registers the evidence management SC_D11 included in the TX with the distributed ledger D1, through the SC execution/management unit 32 (S204). Specifically, based on the content of the TX, the consensus management unit 31 enters an SC_ID and an SC body as state information, into the distributed ledger D1, and adds a block including the TX, i.e., deployment TX to the tail of the BC.

Finally, the consensus management unit 31 sends a result of execution of the deployment TX back to the TX issuer (S205).

A case where the received TX is an execution TX indicating execution of the evidence management SC_D11 (a case where "NO" results at S202) will be described. In this case, the consensus making process is carried out in the same manner as in the case of the deployment TX (S206). This consensus making process is the same as the consensus making process at S203.

When the consensus making is completed, the consensus management unit 31 executes the evidence management SC_D11 through the SC execution/management unit 32, thereby updating the content of the distributed ledger D1 (S207). Specifically, the consensus management unit 31 gives a call function specified in the execution TX and input arguments, to an evidence management SC_D11 having an SC_ID specified in the execution TX (the evidence management SC_D11 is assumed to be already registered), and the executes the evidence management SC_D11.

The consensus management unit 31 then updates the content of the distributed ledger D1, based on a result of execution of the evidence management SC_D11. Based on the execution result, the consensus management unit 31 updates state information D12 on the evidence management SC_D11, and adds the execution TX as a block, to the tail of the BC. Finally, the consensus management unit 31 sends a result of execution of the execution TX (e.g., a return value of the function) to the TX issuer (S209).

<Flow of Processes by Evidence Management SC>

Figure 9:
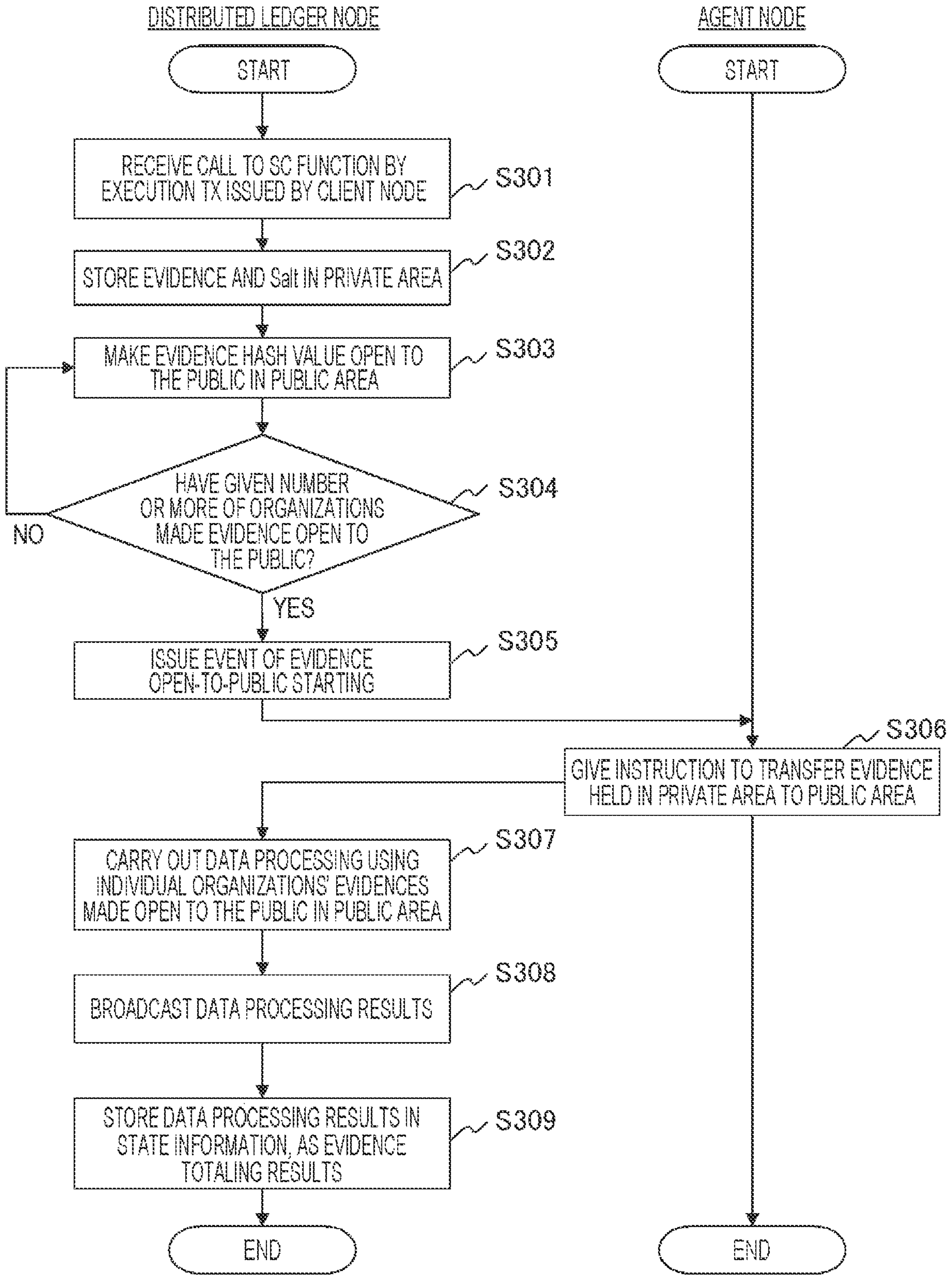
FIG. 9 depicts an example of the flowchart of the evidence management method according to the present embodiment.
Figure 10:
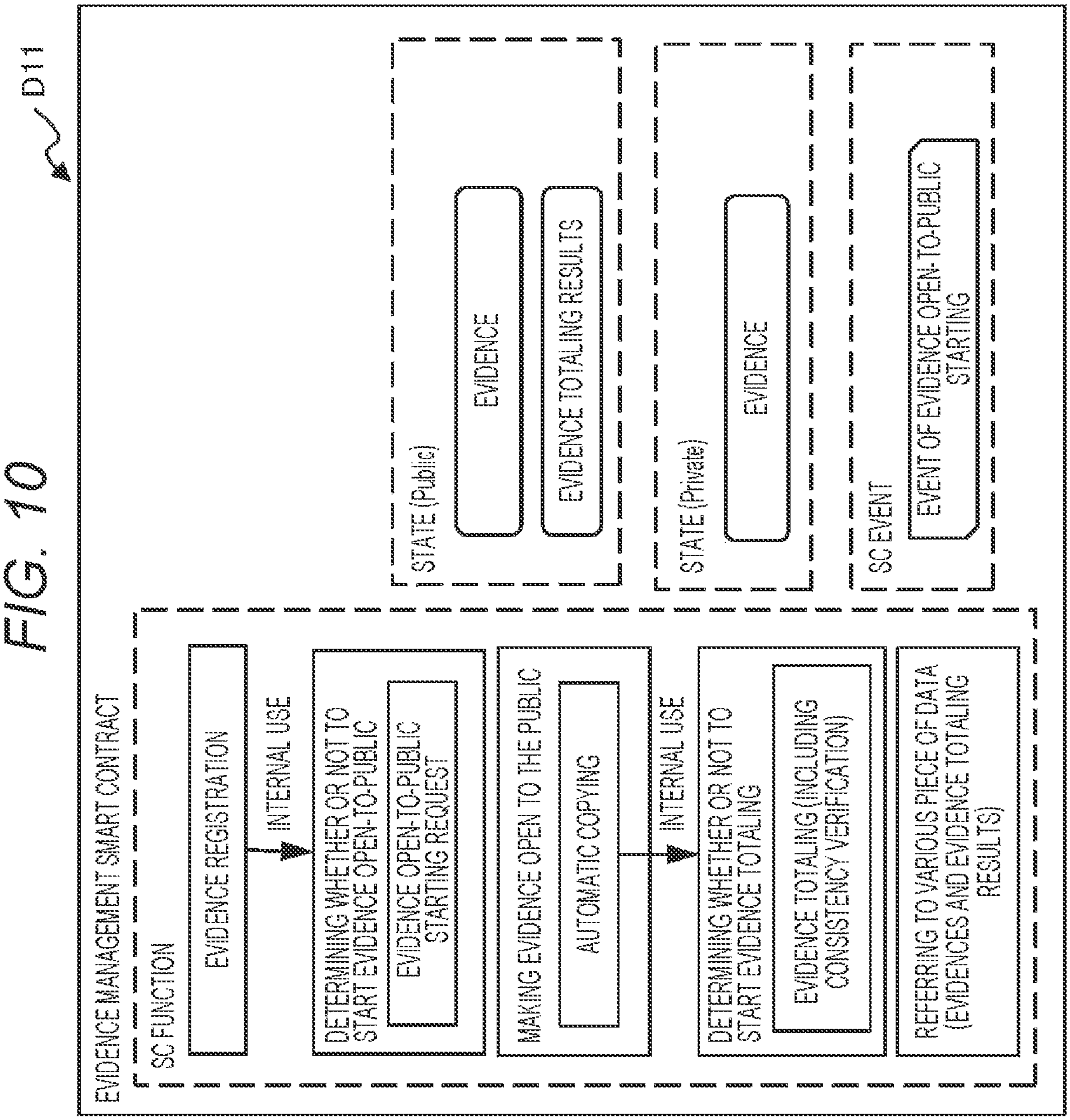
FIG. 10 depicts an example of an evidence management smart contract according to the present embodiment.

FIG. 9 is a flowchart showing an example of processes by the evidence management SC_D11, and FIG. 10 depicts an internal configuration of the evidence management SC_D11. When, for example, receiving a call to an SC function "evidence registration" of the evidence management SC_D11 by an execution TX issued by the client node 4 (S301), each distributed ledger node 3 executes an evidence registration process according to the execution TX, through the function of SC execution/management unit 32.

Subsequently, the evidence management SC_D11 of each distributed ledger node 3 stores an evidence and Salt included in the TX broadcasted from the transaction issuing unit 42 of the client node 4, in the private area D112 of the distributed ledger D1 (S302).

Generation of the TX by the transaction generating unit 43 of the client node 4 and issuing of the TX by the transaction issuing unit 42 of the same have already been described above (FIG. 11).

The evidence management SC_D11 of the distributed ledger node 3 inputs both evidence and Salt obtained at S302, to a hash function to generate a hash value, and makes the generated hash value open to the public in the public area D111, as an evidence hash value (S303). At this time, the evidence hash value is stored in the state information such that the hash value is association with an organization ID and a target event ID (voting ID, management ID, etc.).

The distributed ledger node 3 of each organization executes the above-described S301 to S303, and consequently records including evidence hash values made open to the public by individual organizations are accumulated in the public area D111 of the distributed ledger D1.

The evidence management SC_D11 of the distributed ledger node 3 refers to information made open to the public in the public area D111 of the distributed ledger D1, and determines, for example, whether evidence hash values (information on evidences) are made open to the public by a given number or more of organizations (S304).

When determining that evidence hash values are made open to the public by a given number or more of organizations (S304: Yes), the evidence management SC_D11 issues an event of open-to-public starting of the evidence (S305). The event issued by the evidence management SC_D11 is embedded in the BC, and the distributed ledger node 3 receiving the BC sends a notice to the agent node 5 of the organization relevant to the event.

When receiving a request for making information on an evidence (evidence hash value or the like) open to the public in the public area D111 or a request for updating the information, from the client node 4 after issuing the event of open-to-public starting at S305, the evidence management SC_D11 rejects the request. The evidence management SC_D11 adds information at a timing of having been made open to the public or updated after issuance of the event of open-to-public starting, to information on the evidence hash value or the like so that the information can be verified later.

Meanwhile, the agent program 51 of the agent node 5 causes the event receiving unit 511 to receive the above event of open-to-public starting, and transfers an evidence held in the private area D112 of the distributed ledger D1 of the organization to which the agent node 5 belongs, to the public area D111, that is, executes evidence open-to-public (S306).

It is preferable that at execution of evidence open-to-public at S306, the agent node 5 make the evidence open to the public in a subgroup consisting of a given number of organizations including the organization to which the agent node 5 belongs. In such a case, data processing, such as data totaling, on the evidence made open to the public is too executed in the subgroup, and a result of the data processing is made open to other subgroups.

The evidence management SC_D11 executes prescribed data processing, using an evidence of each organization made open to the public in the public area D111 (S307).

This data processing is not particularly limited in content. When a result of electronic named voting is the evidence, totaling voting results is the data processing. When execution/non-execution or success/failure of system operation work is the evidence, identifying success/failure of system operations by the entire organizations is the data processing.

The evidence management SC_D11 issues a TX from the transaction issuing unit 35, the TX being related to a result of the data processing, and broadcasts the TX to the distributed ledger node 3 of each organization (S308). The evidence management SC_D11 of the distributed ledger node 3 stores the incoming data processing result in the state information, as an evidence totaling result (S309).

At execution of the above data processing at S307, the evidence management SC_D11 generates a hash value by combining together an evidence and Salt held in the private area D112 and confirms that the generated hash value matches an evidence hash value made open to the public in the public area D111, and then proceeds with the processing. This confirmation ensures that no illegal act, such as falsification of the evidence, is conducted in data totaling and the like.

Other Examples

At execution of a process of making an evidence open to the public in the public area D111, the management SC_D11 may issue a provisional event of evidence open-to-public starting.

In such a case, in response to the provisional event, the agent program 51 of the agent node 5 requests the client node 4 or the distributed ledger node 3 of the organization to which the agent node 5 belongs, to issue a TX inquiring about the authenticity of the provisional event, and causes organizations to carry out consensus making.

When evidence open-to-public starting is confirmed through this process, the evidence management SC_D11 is allowed to issue an event of open-to-public starting.

When, as a result of organizations' making their evidences open to the public in the public area D111, the number of organizations having made their evidences open to the public has reached a given number, that is, an evidence open-to-public status meets a given condition, the evidence management SC_D11 causes the transaction issuing unit 35 to issue a provisional event of data processing starting.

In such a case, in response to the provisional event of data processing, the agent node 5 requests the client node 4 or the distributed ledger node 3 of the organization to which the agent node 5 belongs, to issue a TX inquiring about the authenticity of the provisional event, and causes organizations to carry out consensus making.

When data processing on the evidence is confirmed through this process, the evidence management SC_D11 is allowed to execute the data processing.

The embodiment of the present invention has been described in detail with reference to the drawings. Specific configurations according to the invention, however, are not limited to the present embodiment and may include design concepts not departing from the substance of the present invention.

According to the present embodiment, in carrying out transparent and appropriate collection/totaling of evidences across organizations, timing of making an evidence open to the public between organizations can be controlled in a non-centralized manner.

The description made herein reveals at least the following facts. According to the evidence management method of the present embodiment, the smart contract may execute prescribed data processing, using the evidence made open to the public in the public area.

This makes a totaling process, etc., efficient, the totaling process being related to such events as the presence/absence or success/failure of equipment operation by each organization and electronic voting. As a result, in carrying out transparent and appropriate collection/totaling of evidences across organizations, timing of making an evidence open to the public between organizations can be controlled in a non-centralized manner.

According to the evidence management method of the present embodiment, the smart contract may confirm at execution of the data processing that a calculated value given by a certain calculation procedure, based on the evidence held in the private area, matches a calculated value included in or based on the information made open to the public in the public area.

This allows confirming and ensuring that the value is not falsified both in the public area and in the private area, that is, the evidence is authentic. As a result, in carrying out transparent and appropriate collection/totaling of evidences across organizations, timing of making an evidence open to the public between organizations can be controlled in a non-centralized manner. It should be noted that the above calculated value given by the certain calculation procedure is, for example, a hash value.

According to the evidence management method of the present embodiment, when saving the evidence in the private area, the smart contract may manage the evidence in a state of being combined with a unique value unique to each organization. It should be noted that the unique value is, for example, a random number.

As a result, even if the evidence is small in data size or simple in value structure, it is difficult to estimate the original evidence from a hash value thereof. As a result, in carrying out transparent and appropriate collection/totaling of evidences across organizations, timing of making an evidence open to the public between organizations can be controlled in a non-centralized manner.

According to the evidence management method of the present embodiment, the smart contract may issue an event of open-to-public starting of the evidence, as a process of making the evidence open to the public, and in response to the event of open-to-public starting, the agent node of each of the plurality of organizations may execute a process of making the evidence open to the public in the public area.

According to this approach, even if the number of organizations involved becomes greater, the process of making the evidence open to the public in the public area can be carried out smoothly. As a result, in carrying out transparent and appropriate collection/totaling of evidences across organizations, timing of making an evidence open to the public between organizations can be controlled in a non-centralized manner.

According to the evidence management method of the present embodiment, when making the evidence open to the public, the smart contract or a subgroup created in advance according to a predetermined rule may execute the process of making the evidence open to the public and the data processing within the subgroup and make a result of the data processing open to other subgroups. According to this approach, data totaling is carried out in the subgroup and then its results are made open to other subgroups. By this approach, therefore, a range of making the evidence open to the public can be limited to the subgroup. As a result, in carrying out transparent and appropriate collection/totaling of evidences across organizations, timing of making an evidence open to the public between organizations can be controlled in a non-centralized manner.

According to the evidence management method of the present embodiment, after issuing the event of open-to-public starting, the smart contract may reject making the information on the evidence open to the public in the public area or updating the information, or may add information at a timing of being made open to the public or updated after issuance of the event of open-to-public starting, to the information.

This prevents falsification of the evidence having been made open to the public. As a result, in carrying out transparent and appropriate collection/totaling of evidences across organizations, timing of making an evidence open to the public between organizations can be controlled in a non-centralized manner.

According to the evidence management method of the present embodiment, the smart contract may issue a provisional event of evidence open-to-public starting in response to a trigger event, as a process of making the evidence open to the public, and in response to the provisional event, the agent node may confirm the evidence open-to-public starting following consensus making between the plurality of organizations, thus issuing the event of open-to-public starting.

This prevents a case where, for example, a certain organization who wants to view an evidence of a different organization issues an event of open-to-public starting in a situation where an open-to-public starting condition is not met and the evidence is made open to the public despite the condition being not met. As a result, in carrying out transparent and appropriate collection/totaling of evidences across organizations, timing of making an evidence open to the public between organizations can be controlled in a non-centralized manner.

According to the evidence management method of the present embodiment, when, as a result of the each of the plurality of organizations' making the evidences open to the public in the public area, a status of making the evidences open to the public meets a given condition, the smart contract may issue a provisional event of starting the data processing, and in response to the provisional event, the agent node of a given organization may carry out the data processing following consensus making between the plurality of organizations.

This prevents a case where, for example, a certain organization who wants to check an evidence total value or the like carries out the data processing arbitrarily. As a result, in carrying out transparent and appropriate collection/totaling of evidences across organizations, timing of making an evidence open to the public between organizations can be controlled in a non-centralized manner.

What is claimed is:

1. An evidence management method carried out in a distributed ledger system including nodes of a plurality of organizations, wherein a smart contract of each of the plurality of organizations refers to information made open to public in a public area, the information being related to an evidence held in a private area of each of the plurality of organizations, and in response to a trigger event of the information's meeting a given condition, executes a process of making the evidence open to the public in the public area, the evidence being held in the private area of an organization to which the smart contract belongs, wherein, in carrying out transparent and appropriate collection of evidences across the plurality of organizations, a result of the execution of the process is inputted to a processor to control, in a non-centralized manner, timing of making the evidence open to the public between the organizations.

2. The evidence management method according to claim 1, wherein the smart contract executes prescribed data processing, using the evidence made open to the public in the public area.

3. The evidence management method according to claim 2, wherein the smart contract confirms at execution of the data processing that a calculated value given by a certain calculation procedure, based on the evidence held in the private area, matches a calculated value included in or based on the information made open to the public in the public area.

4. The evidence management method according to claim 1, wherein when holding the evidence in the private area, the smart contract manages the evidence in a state of being combined with a unique value unique to each organization.

5. The evidence management method according to claim 2, wherein the smart contract issues an event of open-to-public starting of the evidence, as a process of making the evidence open to the public, and in response to the event of open-to-public starting, an agent node of each of the plurality of organizations executes a process of making the evidence open to the public in the public area.

6. The evidence management method according to claim 5, wherein when making the evidence open to the public, the smart contract or a subgroup created in advance according to a predetermined rule executes the process of making the evidence open to the public and the data processing within the subgroup, and makes a result of the data processing open to other subgroups.

7. The evidence management method according to claim 5, wherein after issuing the event of open-to-public starting, the smart contract rejects making the information on the evidence open to the public in the public area or updating the information, or adds information at a timing of being made open to the public or updated after issuance of the event of open-to-public starting, to the information.

8. The evidence management method according to claim 5, wherein the smart contract issues a provisional event of evidence open-to-public starting in response to the trigger event, as a process of making the evidence open to the public, and in response to the provisional event, the agent node confirms the evidence open-to-public starting following consensus making between the plurality of organizations, thus issuing the event of open-to-public starting.

9. The evidence management method according to claim 5, wherein when, as a result of the each of the plurality of organizations' making the evidences open to the public in the public area, a status of making the evidences open to the public meets a given condition, the smart contract issues a provisional event of starting the data processing, and in response to the provisional event, an agent node of a given organization carries out the data processing following consensus making between the plurality organizations.

10. An evidence management system, embodied on a non-transitory computer readable medium, serving as a distributed ledger system including nodes of a plurality of organizations, wherein a smart contract of each of the organizations refers to information made open to public in a public area, the information being related to an evidence held in a private area of each of the plurality of organizations, and in response to a trigger event of the information's meeting a given condition, executes a process of making the evidence open to the public in the public area, the evidence being held in the private area of an organization to which the smart contract belongs, wherein, in carrying out transparent and appropriate collection of evidences across the plurality of organizations, a result of the execution of the process is inputted to a processor to control, in a non-centralized manner, timing of making the evidence open to the public between the organizations.

11. A node, embodied on a non-transitory computer readable medium, that is one of nodes of a plurality of organizations making up a distributed ledger system, the node holding a smart contract that refers to information made open to public in a public area, the information being related to an evidence held in a private area of each of the plurality of organizations, and that in response to a trigger event of the information's meeting a given condition, executes a process of making the evidence open to the public in the public area, the evidence being held in the private area of an organization to which the smart contract belongs, wherein, in carrying out transparent and appropriate collection of evidences across the plurality of organizations, a result of the execution of the process is inputted to a processor to control, in a non-centralized manner, timing of making the evidence open to the public between the organizations.

* * * * *